United States Patent

[11] 3,633,934

[72] Inventor Karl Wilfert
      Gerlingen-Waldstadt, Germany
[21] Appl. No. 807,216
[22] Filed Mar. 14, 1969
[45] Patented Jan. 11, 1972
[73] Assignee Daimler-Benz Aktiengesellschaft
      Stuttgart-Unterturkheim, Germany
[32] Priority Mar. 14, 1968
[33]           Germany
[31]           P 16 80 029.6

[54] SAFETY FRAME FOR AUTOMOTIVE VEHICLES
     14 Claims, 5 Drawing Figs.
[52] U.S. Cl. .................................................... 280/106 R,
                                                         296/28 F
[51] Int. Cl. ..................................................... B62d 21/02
[50] Field of Search ........................................... 188/1 C;
                                    280/106; 296/28, 28.8; 293/53, 86

[56]                References Cited
               UNITED STATES PATENTS
2,751,247  6/1956  Barenyi ......................... 280/106 X
2,811,385  10/1957 Butler ............................ 188/1 C
2,837,176  6/1958  Dropkin ......................... 188/1
2,896,735  7/1959  Bohn ............................. 293/52 F
2,991,115  7/1961  Wilfert .......................... 280/106 X
2,997,325  8/1961  Peterson ........................ 293/86 X
3,251,460  5/1966  Edmonds ........................ 229/2.5 X
3,268,256  8/1966  Blank ............................ 293/52 F Primary Examiner—Richard J. Johnson
Attorney—Craig, Antonelli and Hill ABSTRACT: A safety frame formed of telescoping bearing members secured together by a fracturable bolt and including a force-absorbing material in one member serving as a cylinder for absorbing force from the other member serving as a piston upon fracture of said bolt.

INVENTOR
KARL WILFERT

ATTORNEYS

PATENTED JAN 11 1972

INVENTOR
KARL WILFERT

BY Craig, Antonelli, Stewart & Hill
ATTORNEYS

SAFETY FRAME FOR AUTOMOTIVE VEHICLES

The invention relates to a safety frame for automotive vehicles, especially for passenger cars, which frame is constructed, in the zone of the passenger compartment, to be deformation-resistant, and, in the zone of the front and/or rear end sections, to be subjectable to deformation in order to absorb energy due to collisions by such deformation.

Such frames by their construction increase the internal safety of the vehicle for the passengers considerably, but certain difficulties are encountered in practice in constructing the end sections of these safety frames in such a manner that energy is dissipated to a sufficient extent during collisions, while yet maintaining a sufficient amount of strength during the normal operation of the vehicle to provide the necessary support.

The invention is based on the problem of providing a safety frame of the type mentioned above which is distinguished by a defined absorption of the energy to be dissipated during a collision. The invention resides in that the longitudinal bearers of the front and/or rear end sections adjoining the passenger compartment are constructed in the manner of pistons and cylinders connected with each other by means of fastening elements, which elements can be subjected to a load of up to a limited value without fracture thereby having a predetermined breaking point, whereas means for the absorption of energy are disposed within the cylinders. The so-called fastening elements having a desired or predetermined breaking point can easily be dimensioned so that they exhibit a sufficient strength during normal driving operation to provide necessary support, whereas they are destroyed in case of a collision, and the desired energy dissipation can be effected by the means located within the cylinders.

Suitably, the ends of the longitudinal bearers of the end section or sections can be connected by a transverse bearer or channel which latter is preferably constructed as a shock absorber. Advantageously, the longitudinal bearers of the end section or sections can be joined to the passenger compartment by way of supports extending approximately vertically.

A particularly advantageous embodiment of the invention is obtained by a constructional feature wherein an end section consists of four longitudinal bearers which are disposed in pairs one above the other. In this connection, the external cylinders or pistons of the superimposed longitudinal bearers can advantageously consist of a single, approximately U-shaped part.

As means for the absorption of energy, conventional deformation members can be disposed within the cylinders, such as hollow disk washers or the like. It is also possible to fill the cylinders with an energy-dissipating medium, such as foam material or the like.

In a structurally extremely simple manner, bolts can be provided as the fastening elements between the pistons and the cylinders, which bolts can only be subjected to a limiting shearing load. In case of such bolts, the magnitude of the shearing force can be readily dimensioned and limited. Suitably, the cylinders and pistons can be connected with each other in an elastically resilient manner.

In order to avoid damage to the chassis in case of minor collisions, the wheel torsion spring plates, the steering parts, and the like can be mounted at the cylinders or pistons adjoining the passenger space.

It is an object of the present invention to provide a safety frame construction which eliminates or substantially avoids the difficulties and disadvantages inherent in known arrangements of a similar nature.

It is another object of the present invention to provide a safety frame construction which is quite strong in connection with transverse forces, but yieldable to lesser forces applied in the axial direction.

It is still another object of the present invention to provide a safety frame construction including fracturable fastening means which provides proper securing of telescoping parts during normal use, but permitting compression of the parts upon application of collision forces thereto.

It is a further object of the present invention to provide a safety frame including energy absorbing deformable material to absorb collision forces and prevent transmission thereof to the passenger compartment.

These and other objects, features and advantages of the present invention will become more apparent from the following detailed description thereof when taken in conjunction with the accompanying drawings, wherein.

Figure 1:
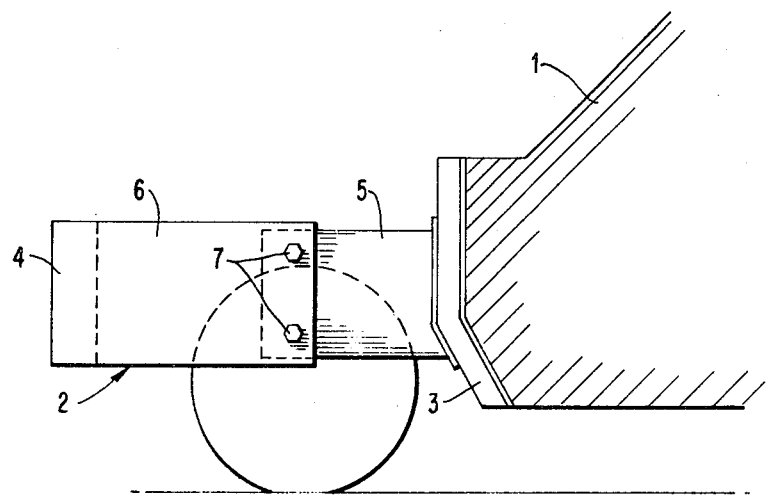
FIG. 1 shows a simple construction of a safety frame according to this invention.
Figure 2:
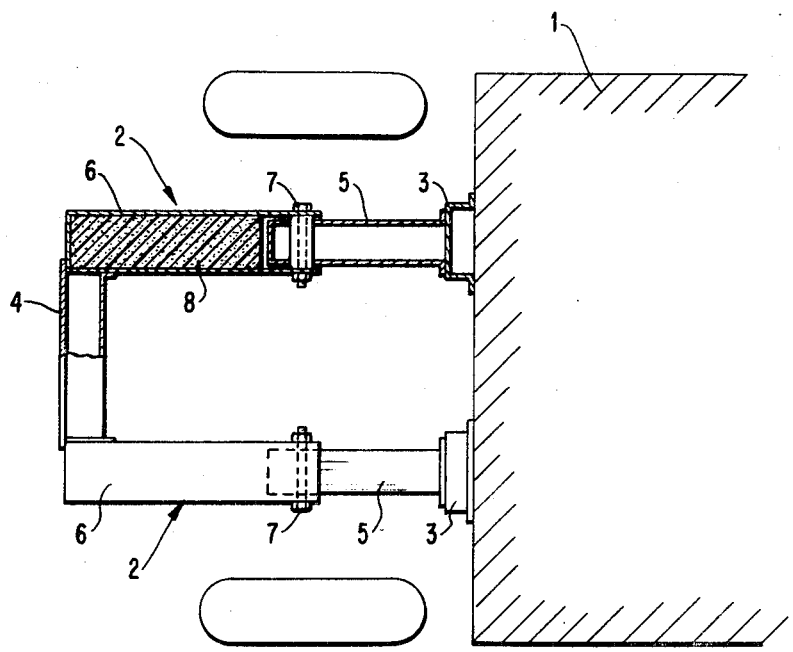
FIG. 2 shows a plan view, partially in section, of the safety frame according to FIG. 1.

The safety frame according to FIG. 1 consists of a passenger compartment 1 which is fashioned to be deformation-resistant in a well-known manner not illustrated in detail, and of an end section adjacent thereto, which end section is particularly constructed to absorb energy through deformation. Two longitudinal channels or bearers 2 serve as the end section; these girders are connected to vertical supports 3 disposed at the dashboard of the passsenger space 1 and are connected at their end by means of a cross support or bearer 4. The longitudinal bearers 2 consist of two parts fashioned in the manner of a piston 5 and a cylinder 6. The two parts are connected by way of two bolts 7 serving as the so-called fastening elements for the two parts and having a desired breaking point by limiting the shearing force transmittable by these bolts to a predetermined value, such as by proper selection of the material of which the bolt is made or the physical dimensions thereof, or both. In this embodiment, the pistons 5 adjoin the vertical supports 3 of the passenger compartment 1, whereas the two cylinders 6 extend toward the front and rear in the front and rear end sections, respectively.

An energy-dissipating medium 8 is disposed within the cylinders 6, for example a foam material, which becomes effective in case of a collision after the fastening members 7 having a predetermined breaking point have been destroyed, at the instant the cylinders 6 are pushed over the pistons 5. In this connection, the medium 8 in the cylinders 6 absorbs energy of a defined magnitude.

Figure 3:
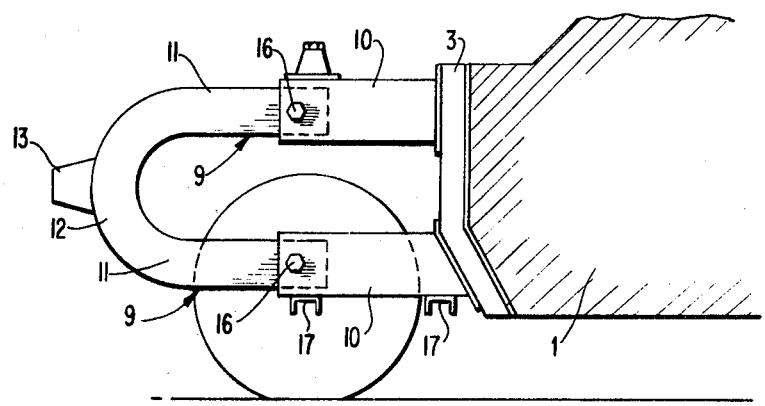
FIG. 3 is another embodiment of a safety frame according to this invention.

In the embodiment of FIG. 3, the end sections, which are likewise connected to the passenger space 1 by way of vertical support channels 3, consist of four longitudinal girders 9 disposed one above the other in pairs. In this embodiment, the cylinders 10 are connected to the vertical supports 3 and are provided with pistons 11 extending toward the front and the rear in the two end sections, respectively. In accordance with the invention, the pistons 11 of two superimposed cylinders 10 may be integrally joined to form an approximately U-shaped part 12, thereby insuring conjoint operation of the joined pistons. In this embodiment, too, a transverse support 13 is provided connecting the longitudinal bearers 9 with one another and advantageously forming a shock absorber.

Figure 4:
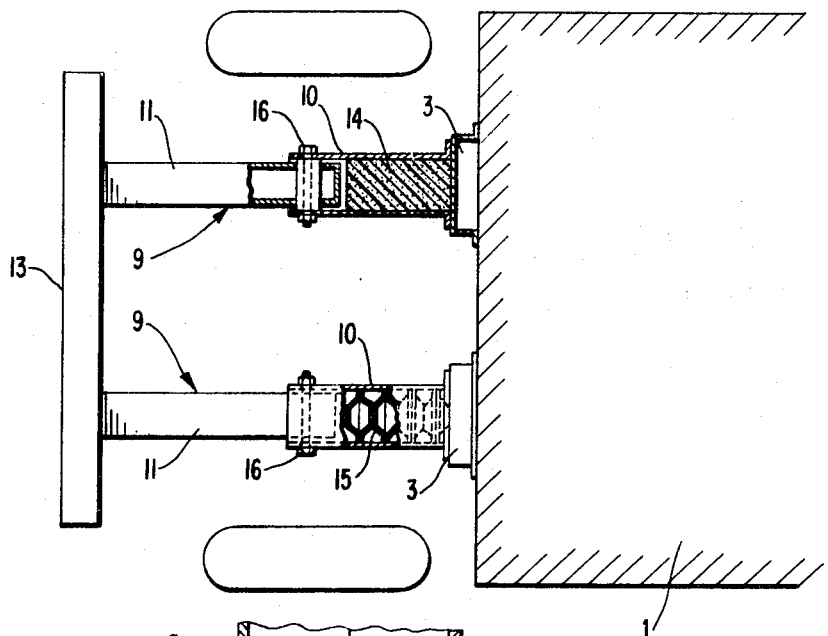
FIG. 4 is a plan view, partially in section, of the safety frame according to FIG. 3.

Within the cylinders 10, energy-dissipating media 14, such as a foam material (see upper half of FIG. 4) or conventional deformation members, such as hollow disk washers 15 (lower half of FIG. 4), can be disposed. The pistons and cylinders are connected likewise by so-called fastening means having a desired breaking point, which latter can consist of the bolts 16 in this embodiment also. In order to prevent damage to the chassis in case of minor collisions wherein the fastening means 16 having a desired breaking point are destroyed, the bearings 17 of the wheel torsion spring plates and the bearings of the steerage parts are suitably provided at the parts facing, in each case, the passenger compartment 1, in this embodiment, on the cylinders 10. In contrast thereto, it is readily possible to suspend the engine, for example, at the front piston 11.

Figure 5:
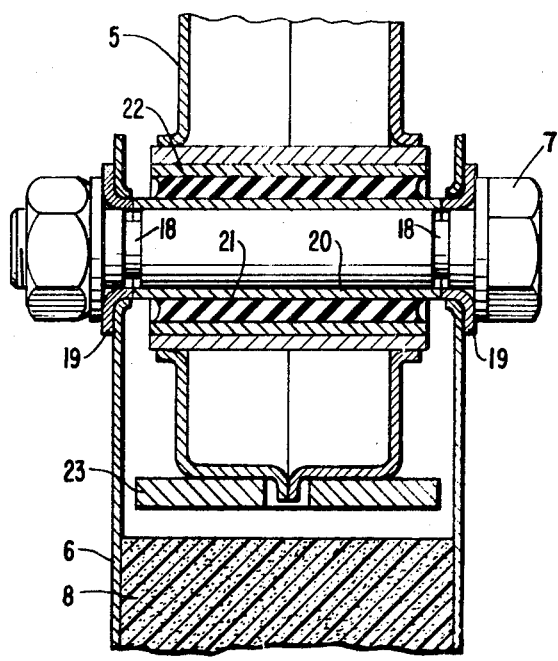
FIG. 5 illustrates a detail of the connection of the parts pertaining to the safety frame according to FIGS. 1 and 2 or 3 and 4.

In FIG. 5, the connection of the two parts 5 and 6 by means of the fastening members 7 (and also 16) having a desired breaking point is illustrated on a larger scale. These members consist of a bolt 7 provided with grooves 18 for limiting or determining the maximum shearing force withstandable by the bolt. In order to insure that these bolts 7 are subjected only to a shearing force, annular disks 19 are inserted into the bores of the cylinder 6, followed by shearing bushings 20. Simultaneously, an elastic mounting can be achieved between piston 5 and cylinder 6, so that the shearing bushings 20 serve as the inner bearing parts of a rubber or other elastic bushing sleeve 21, which latter are held in the cylinders 6 by way of the external bearing parts 22. In order to provide that the energy-dissipating media 8 within the cylinders 6 will be under a load over as large an area as possible, plates 23 can be placed on the pistons 5, which plates consist of two pressed sheet metal parts; these plates correspond approximately to the internal diameter of the cylinder 6.

The invention makes it possible in an advantageous manner to obtain a definitive absorption of the energy to be dissipated during collisions, while additionally a simple repair operation becomes possible, since only those parts are deformed or destroyed which have been especially constructed for this purpose and which are readily replaceable. In addition, since the frame is quite strong in connection with forces transverse thereto, but yieldable to lesser forces applied in the axial direction, it will efficiently serve as a bearer of loads during normal operation, and also absorb forces due to collisions directed longitudinally of the vehicle.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are obvious to one of ordinary skill in the art.

I claim:

1. A safety frame for automotive vehicles, particularly for passenger vehicles having a passenger compartment, which safety frame is constructed in the zone of the passenger compartment to be deformation resistant and at least in the zone of the vehicle front end to be susceptible to deformation, comprising
    first and second longitudinal vehicle frame members extending from said passenger compartment for supporting vehicle parts, each frame member being formed of telescoping parts which support the vehicle parts,
    vertical support members mounted against said vehicle passenger compartment and supporting one end of each of said longitudinal vehicle frame members,
    fracturable fastening means in each frame member for securing said telescoping parts to one another to prevent relative displacement thereof, and
    deformable means disposed within one of the telescoping parts for absorbing the energy required in displacing one telescoping part into the other telescoping part upon fracture of said fastening means.

2. A safety frame as defined in claim 2, wherein said frame members include a transverse shock-absorbing member interconnecting the ends of said frame members.

3. A safety frame as defined in claim 1, wherein said frame members as secured to said passenger compartment by way of vertically disposed supports mounted on one side of said passenger compartment.

4. A safety frame as defined in claim 1, wherein said deformable means is provided in the form of a foam material filling one of said telescoping parts.

5. A safety frame as defined in claim 1, wherein means for mounting torsion spring plates and steerage members of the vehicle are supported on one of said telescoping parts.

6. A safety frame for automotive vehicles, particularly for passenger vehicles having a passenger compartment, being constructed in the zone of the passenger compartment to be deformation resistant and at least in the zone of the vehicle front end to be susceptible to deformation, comprising
    longitudinally extending frame members extending from said passenger compartment and including at least one frame member formed of telescoping members for supporting vehicle parts,
    fracturable fastening means for securing said telescoping members to prevent relative displacement thereof, and
    deformable means disposed within one of the telescoping members for absorbing the energy required in displacing one telescoping member into the other telescoping member upon fracture of said fastening means,
    wherein said frame members include at least four frame members formed of telescoping parts disposed in pairs one above the other.

7. A safety frame as defined in claim 6, wherein the outwardly disposed members of the superimposed frame members are integrally joined to form a single approximately U-shaped part.

8. A safety frame as defined in claim 7, wherein said frame members further includes a transverse shock-absorbing member interconnecting said approximately U-shaped parts.

9. A safety frame for automotive vehicles, particularly for passenger vehicles having a passenger compartment, being constructed in the zone of the passenger compartment to be deformation resistant and at least in the zone of the vehicle front end to be susceptible to deformation, comprising
    longitudinally extending frame members extending from said passenger compartment and including at least one frame member formed of telescoping members for supporting vehicle parts,
    fracturable fastening means for securing said telescoping members to prevent relative displacement thereof, and
    deformable means disposed within one of the telescoping members for absorbing the energy required in displacing one telescoping member into the other telescoping member upon fracture of said fastening means,
    wherein said frame members include at least two frame members formed of telescoping members, and
    wherein said deformable means is provided in the form of hollow disc washers disposed within one of said telescoping members.

10. A safety frame for automotive vehicles, particularly for passenger vehicles having a passenger compartment being constructed in the zone of the passenger compartment to be deformation resistant and at least in the zone of the vehicle front end to be susceptible to deformation, comprising
    longitudinally extending frame members extending from said passenger compartment and including at least one frame member formed of telescoping members each member being adapted for supporting vehicle suspension or engine parts,
    fracturable fastening means for securing said telescoping members to prevent relative displacement thereof, and
    deformable means disposed within one of the telescoping members for absorbing the energy required in displacing one telescoping member into the other telescoping member upon fracture of said fastening means,
    wherein said fracturable fastening means include a bolt passing through both telescoping members of said frame member and being formed to fracture under a limited shearing force load.

11. A safety frame as defined in claim 10, wherein said fracturable fastening means include resilient means interposed between said telescoping members.

12. A safety frame for automotive vehicles, particularly for passenger vehicles having a passenger compartment, being constructed in the zone of the passenger compartment to be deformation resistant and at least in the zone of the vehicle front end to be susceptible to deformation, comprising
    longitudinally extending frame members extending from said passenger compartment and including at least one frame member formed of telescoping members for supporting vehicle parts, fracturable fastening means for securing said telescoping members to prevent relative displacement thereof, and deformable means disposed within one of the telescoping members for absorbing the energy required in displacing one telescoping member into the other telescoping member upon fracture of said fastening means, wherein said fracturable fastening means include a bolt passing through said telescoping members, annular discs inserted into bores in one of said telescoping members through which said bolt passes, a shearing bushing surrounding said bolt, an elastic sleeve surrounding said shearing bushing and an outer bushing surrounding said elastic sleeve and mounted in one end of said other telescoping member.

13. A safety frame as defined in claim 12, wherein said bolt is provided with at least one annular groove to render said bolt fracturable under a limited shear load.

14. A safety frame as defined in claim 13, wherein said other telescoping member serves as a piston and is provided with a transverse plate mounted on the free end thereof.

* * * * *